R. S. JACKSON.
SAW SWAGE.
APPLICATION FILED NOV. 2, 1908.
940,024.
Patented Nov. 16, 1909.
3 SHEETS—SHEET 1.
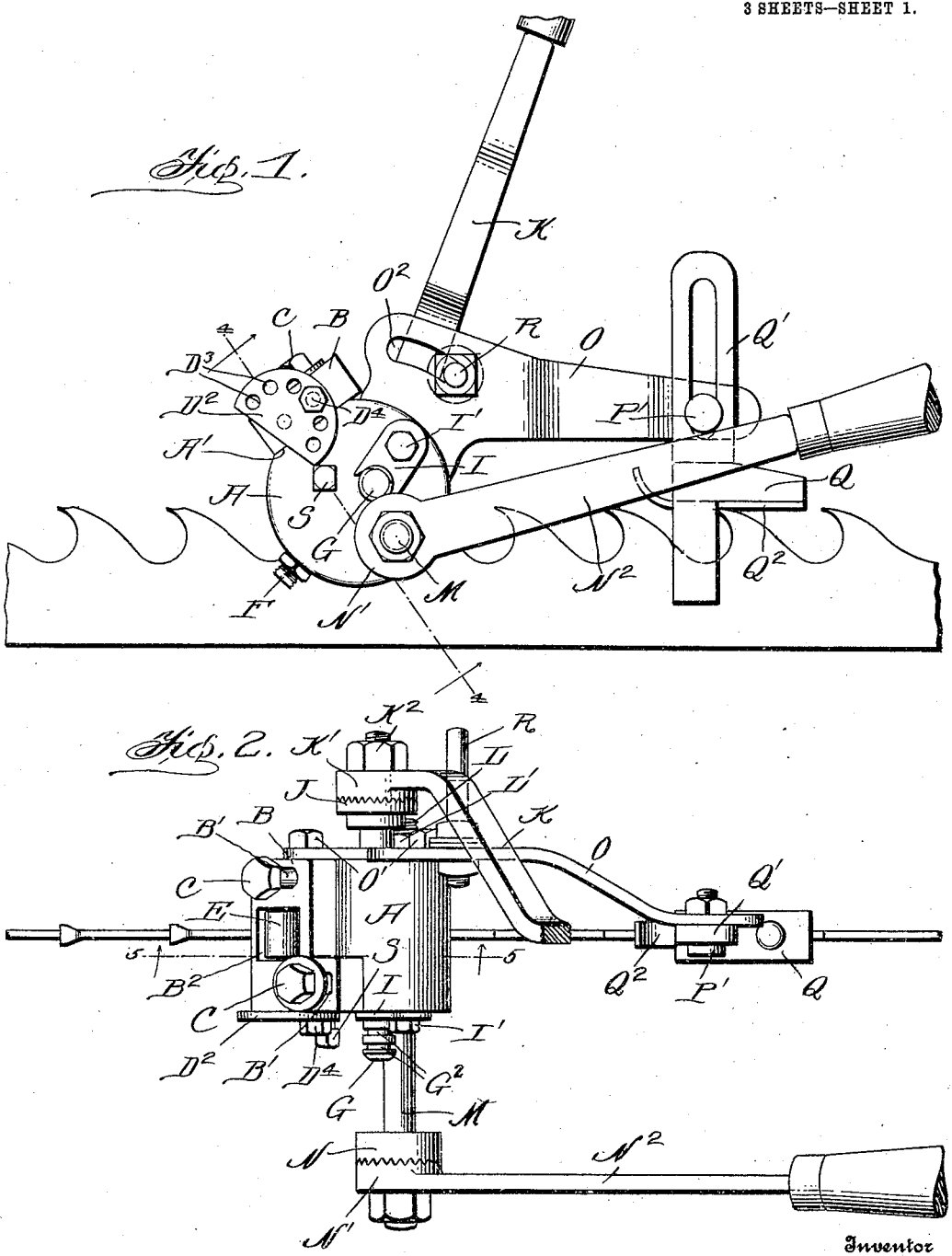
Witnesses
Oliver W. Holmes.
Geo. P. Wright.
Inventor
R. S. Jackson
By Meade L. Broch
Attorney

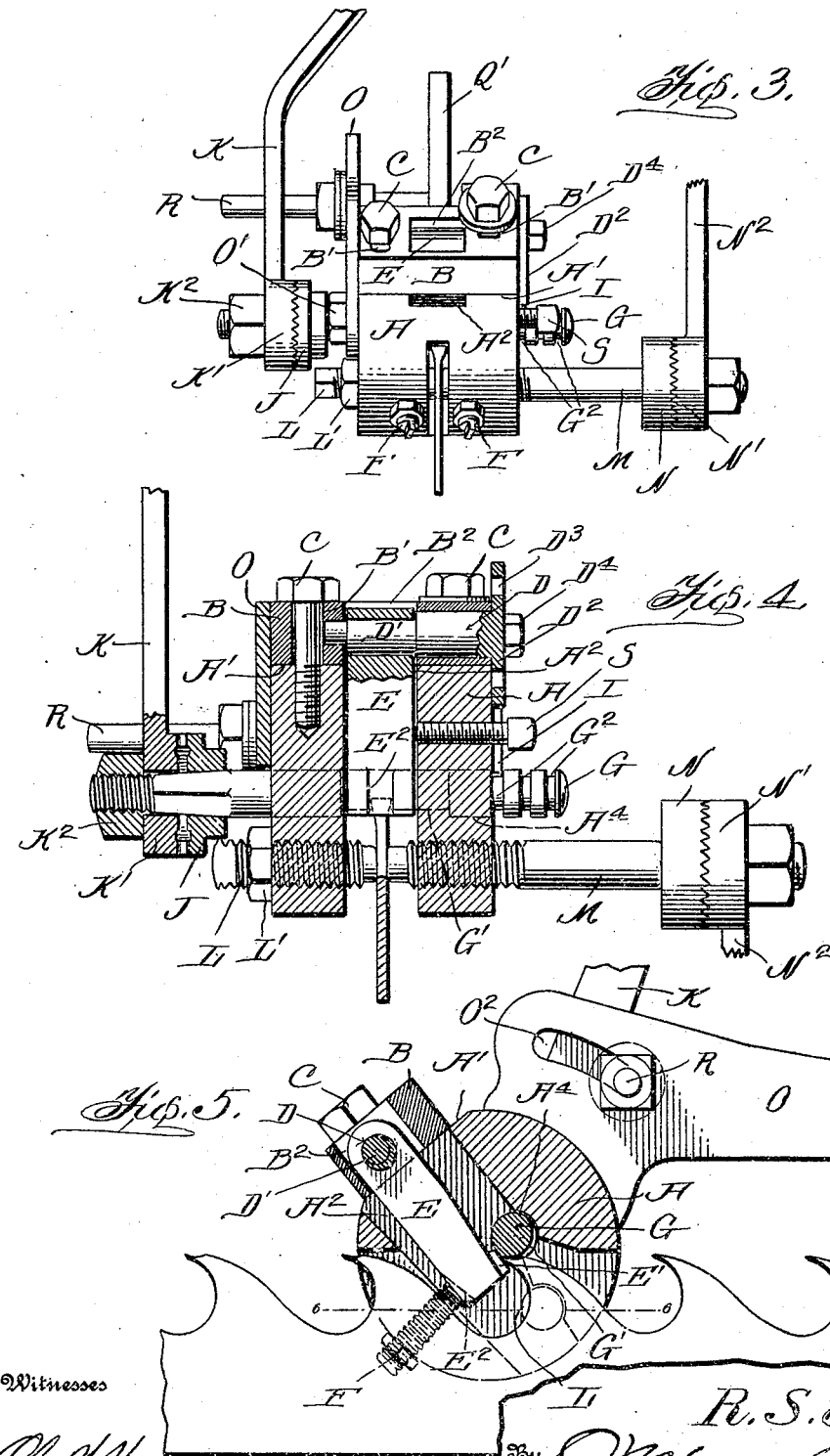

R. S. JACKSON.
SAW SWAGE.
APPLICATION FILED NOV. 2, 1908.
940,024.
Patented Nov. 16, 1909.
3 SHEETS—SHEET 3.
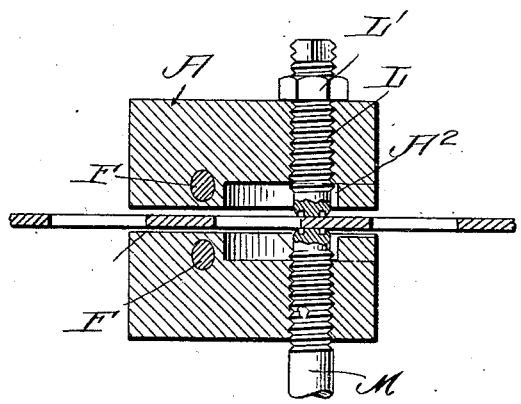
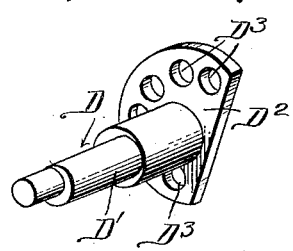
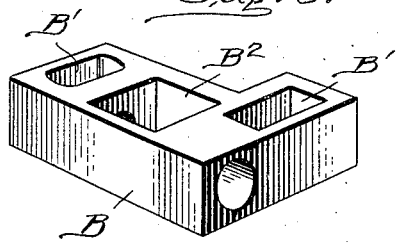
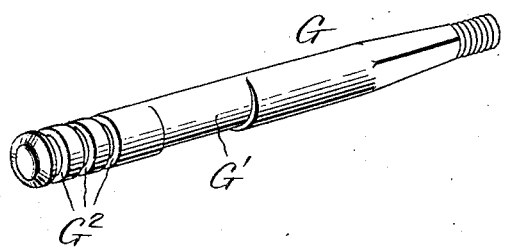
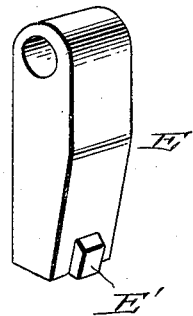
Witnesses
Oliver W. Holmes
Rea P. Albright
Inventor
R. S. Jackson,
By Meara & Brock
Attorney

UNITED STATES PATENT OFFICE.

ROBERT S. JACKSON, OF MALVERN, ARKANSAS.

SAW-SWAGE.

940,024.  Specification of Letters Patent.  Patented Nov. 16, 1909.

Application filed November 2, 1908. Serial No. 460,744.

*To all whom it may concern:*

Be it known that I, ROBERT S. JACKSON, a citizen of the United States, residing at Malvern, in the county of Hot Spring and State of Arkansas, have invented a new and useful Improvement in a Saw-Swage, of which the following is a specification.

This invention relates to certain new and useful improvements in saw swages, the object being to provide a swage with an eccentric die for swaging the top of the tooth instead of underneath as with swages now in use.

A further object of the invention is to provide a swage with an adjustable anvil so that the same can be adjusted with respect to the point of the tooth.

A still further object of the invention is to provide means for holding and guiding the swage on a saw whereby it can be readily locked in its adjusted position.

Another object of my invention is to provide an adjustable stop for limiting the movement of the arm carrying the eccentric die.

A further object of the invention is to provide a saw swage which is composed of a very few parts so arranged and connected that they can be easily and quickly detached or assembled.

Another object of my invention is to provide a saw swage which is exceedingly simple and cheap in construction and one which can be easily and quickly placed on the saw and locked in its adjusted position so as to swage the teeth.

With these various objects in view, my invention consists in the novel features of construction, arrangement and combination of parts hereinafter described, pointed out in the claims and shown in the accompanying drawings, in which:—

Figure 1 is a side elevation of my improved swage showing the application of the same. Fig. 2 is a top plan view, one of the arms being broken away. Fig. 3 is an end view. Fig. 4 is a section taken on line 4—4 of Fig. 1. Fig. 5 is a section taken on the line 5—5 of Fig. 2. Fig. 6 is a section taken on the line 6—6 of Fig. 5. Fig. 7 is a perspective view of the eccentric for adjusting the anvil. Fig. 8 is a perspective view of the plate carrying the eccentric. Fig. 9 is a perspective view of the shaft provided with the eccentric die. Fig. 10 is a perspective view of the anvil.

In carrying out my improved invention, I employ a diametrically slotted cylindrical swage block A which is provided with a flattened portion A' having a recess $A^2$ formed therein communicating with the slot of the block as will be hereinafter fully described. Threaded bores are formed in the flattened portions of the blocks to each side of the recess over which is arranged a plate B provided with slots B' registering with the bores and through which are adapted to extend machine screws C for locking the plate in its adjusted position. The plate is provided with a central cut-out portion $B^2$ registering with the recess of the block A and extending transversely through the plate B is a shaft D provided with an eccentric portion D' on which is mounted an anvil E the lower end of which is provided with a lug E' on one side and a recess $E^2$ upon the opposite side which registers with the slot of the block so as to allow the saw to pass through the block when the block is being adjusted. The shaft is provided with a curved plate $D^2$ at one end having a series of spaced openings $D^3$ through which a screw $D^4$ is adapted to pass which works in the threaded bore formed in one end of the plate B for locking the shaft in its adjusted position so that the anvil can be adjusted with respect to the points of the saw teeth whereby the swage can be made longer or shorter. A threaded bore extends into the recess $A^2$ to each side of the slot in which are mounted screws F adapted to engage the anvil and hold it in its adjusted position. It will be seen that the anvil can be adjusted by either adjusting the plate or operating the shaft.

Extending transversely through the block A is a bore $A^4$ in which is mounted a shaft G which is provided with an eccentric portion G' adapted to engage the top of the tooth of the saw when the same is operated as will be hereinafter described. One end of the shaft G is provided with annular grooves $G^2$ in which is adapted to fit the curved end of a plate I slidably mounted on a screw I' secured in one side of the block for locking the shaft in position and it will be seen that the shaft can be locked in different positions by changing the position of the plate with respect to the different annular grooves. The other end of the shaft is provided with a squared portion on which is secured a clutch washer J adapted to be engaged by the clutch face of a sleeve K′ of a handle K which is locked in engagement with the clutch washer by a nut K² working on the extreme threaded end of the shaft and it will be seen that by loosening the nut the handle can be adjusted with respect to the washer. The handle is preferably formed with an offset portion as clearly shown so as to bring the handle directly over the saw so as to obtain a direct pull.

Extending inwardly from the sides of the block are threaded bores in one of which is mounted a screw L provided with a set nut L′ adapted to engage one side of the saw and in the other bore is mounted the threaded end of a shaft M which is provided with a squared portion on which is a clutch washer N which co-acts with the clutch face of a sleeve N′ and a handle N² which is locked thereon by a nut in a similar manner to the handle heretofore described. For supporting the swage block in position on a saw so as to allow the same to be moved from one tooth to the other I secure to one side of the swage block by screws O′ an arm O which is provided with a slot adjacent its end through which extends a screw which is provided with a guide head P′ which works in a slotted shank Q′ of a shoe Q which is provided with a spring sole Q² adapted to rest on the teeth of the saw in such a position that it can be readily moved along. It will be seen that by adjusting the shoe the position of the swage block can be changed with respect to the teeth of the saw. A slot O² is formed in the arm O in which is adjustably mounted a stop R adapted to be engaged by a handle carried by the shaft with the eccentric die portion.

In order to insure the anvil being held in its proper position, I form a threaded bore in the side of the block communicating with the recess in which is mounted a set screw S adapted to engage the anvil and hold it in its adjusted position.

The operation of the device is as follows:—The block is placed over the saw and the anvil adjusted to the desired position so as to bring the lug of the same up under the tooth of the saw. The clamp screws are then operated so as to lock the swage firmly to the saw and the screws for locking the anvil are then screwed down tight and by operating the handle carrying the eccentric die, the top of the tooth will be swaged as clearly shown.

Having thus fully described my invention, what I claim as new and desire to secure by Letters Patent is:—

1. In a device of the kind described, the combination with a block provided with a recess, of a plate arranged over said recess and an eccentric shaft mounted in said plate, an anvil loosely mounted on said eccentric shaft provided with a lug, means for locking said shaft in its adjusted position together with means for locking said anvil in its adjusted position and a shaft provided with an eccentric die portion mounted within the block adapted to operate upon the top of the teeth.

2. In a device of the kind described, the combination with a diametrically slotted block having a recess communicating with the slot, of a plate adjustably mounted over said recess, an anvil adjustably carried by said plate working in the recess of said block, means for locking and holding said block in position upon a saw and a shaft provided with an eccentric die portion adapted to operate upon the top of a tooth of a saw.

3. In a device of the kind described, the combination with a diametrically slotted cylindrical swage block, having a flattened portion, said block being provided with a recess, of a plate adjustably mounted on said flattened portion, an eccentric shaft mounted in said plate carrying an anvil provided with a lug adapted to extend under the point of a tooth of a saw, means for locking said anvil in its adjusted position, means for locking said block on a saw and a shaft provided with an eccentric die portion extending transversely through said block adapted to operate upon the top of the tooth of a saw.

4. In a device of the kind described, the combination with a swage block, of a plate adjustably mounted on said block, an eccentric shaft mounted in said plate, means for locking said shaft, an anvil mounted on said shaft, set screws for engaging said anvil, and a shaft co-acting with the anvil provided with an eccentric die portion.

5. In a device of the kind described, the combination with a swage block, of a plate adjustably mounted on the block, a shaft provided with an eccentric mounted in said plate, a plate carried by the shaft provided with openings, a screw adapted to extend through one of said openings for locking said shaft to said plate, an anvil mounted on said shaft, set screws carried by the block for holding said anvil in its adjusted position, means for locking said block on a saw and a shaft mounted transversely within the block provided with an eccentric portion adapted to operate upon the top of a tooth of a saw.

6. In a device of the kind described, the combination with a slotted block provided with a flattened portion having a recess communicating with the slot of the block, of a plate provided with slots secured on said flattened portion by screws passing through said slots into bores formed in the block, an anvil pivotally mounted within said plate extending into said recess provided with a lug at its lower end, set screws for holding said anvil against the under side of the tooth of a saw, means for clamping said block on the saw, means for supporting said block in its adjusted position thereon, a stop carried by said means and a shaft extending transversely through said block provided with an eccentric die portion adapted to operate upon the top of the tooth of the saw.

ROBERT S. JACKSON.

Witnesses:
WM. R. DUFFIE,
J. ELMO YOUNG.